US012439963B2

(12) United States Patent
Reevell

(10) Patent No.: US 12,439,963 B2
(45) **Date of Patent: *Oct. 14, 2025**

(54) VAPOR-GENERATING SYSTEM HAVING AN EXTERNAL CARTRIDGE

(71) Applicant: Altria Client Services LLC, Richmond, VA (US)

(72) Inventor: Tony Reevell, London (GB)

(73) Assignee: Altria Client Services LLC, Richmond, VA (US)

( * ) Notice: Subject to any disclaimer, the term of this patent is extended or adjusted under 35 U.S.C. 154(b) by 224 days.

This patent is subject to a terminal disclaimer.

(21) Appl. No.: 17/868,910

(22) Filed: Jul. 20, 2022

(65) Prior Publication Data

US 2022/0346443 A1 Nov. 3, 2022

Related U.S. Application Data

(63) Continuation of application No. 16/915,146, filed on Jun. 29, 2020, now Pat. No. 11,425,795, which is a (Continued)

(30) Foreign Application Priority Data

Dec. 19, 2016 (EP) .................................... 16205104

(51) Int. Cl.
*A24F 47/00* (2020.01)
*A24F 40/30* (2020.01)
(Continued)

(52) U.S. Cl.
CPC .............. *A24F 40/30* (2020.01); *A24F 40/42* (2020.01); *A24F 40/485* (2020.01); *A24F 40/70* (2020.01);
(Continued)

(58) Field of Classification Search
CPC ........ A24F 40/30; A24F 40/485; A24F 40/40; A24F 40/42; A24F 40/46
See application file for complete search history.

(56) References Cited

U.S. PATENT DOCUMENTS

| | | | |
|---|---|---|---|
| 5,816,263 | A | 10/1998 | Counts et al. |
| 8,342,184 | B2 | 1/2013 | Inagaki et al. |

(Continued)

FOREIGN PATENT DOCUMENTS

| | | | |
|---|---|---|---|
| EP | 3061359 | A1 | 8/2016 |
| JP | 2013-509160 | A | 3/2013 |

(Continued)

OTHER PUBLICATIONS

Extended European Search Report for European Application No. 16205104.9 Dated Jul. 12, 2017.

(Continued)

*Primary Examiner* — Eric Yaary
(74) *Attorney, Agent, or Firm* — Harness, Dickey & Pierce, P.L.C.

(57) ABSTRACT

A vapor-generating system includes a cartridge including a first vapor-forming substrate, the cartridge having an annular shape and at least one end configured to abut a flange and at least partially cover a device air inlet, and a vapor-generating device having an outer surface that defines the flange, the vapor-generating device being configured to be overlain by the cartridge such that the cartridge is coupled against the flange, the vapor-generating device including a liquid storage section containing a second vapor-forming substrate, the second vapor-forming substrate being a liquid substrate, and a power supply section, the liquid storage section being configured to removably attach to the power supply section such that at least one of the flange and the
(Continued)

device air inlet are defined by outer surfaces of the liquid storage section and the power supply section.

20 Claims, 6 Drawing Sheets

Related U.S. Application Data continuation of application No. 15/846,694, filed on Dec. 19, 2017, now Pat. No. 10,743,584, which is a continuation of application No. PCT/EP2017/081931, filed on Dec. 7, 2017.

(51) Int. Cl.

| | |
|---|---|
| ***A24F 40/42*** | (2020.01) |
| ***A24F 40/485*** | (2020.01) |
| ***A24F 40/70*** | (2020.01) |
| ***H05B 3/24*** | (2006.01) |
| ***H05B 3/44*** | (2006.01) |
| *A24F 40/10* | (2020.01) |
| *A24F 40/20* | (2020.01) |

(52) U.S. Cl.

CPC ................. *H05B 3/24* (2013.01); *H05B 3/44* (2013.01); *A24F 40/10* (2020.01); *A24F 40/20* (2020.01)

(56) References Cited

U.S. PATENT DOCUMENTS

| | | | | |
|---|---|---|---|---|
| 2013/0014772 | A1 | 1/2013 | Liu | |
| 2013/0213419 | A1* | 8/2013 | Tucker | A24F 40/46 131/328 |
| 2013/0333700 | A1 | 12/2013 | Buchberger | |
| 2014/0150785 | A1* | 6/2014 | Malik | A61M 11/042 128/202.21 |
| 2014/0166029 | A1 | 6/2014 | Weigensberg et al. | |
| 2014/0190496 | A1 | 7/2014 | Wensley et al. | |
| 2014/0346689 | A1 | 11/2014 | Dubief | |
| 2015/0027457 | A1 | 1/2015 | Janardhan et al. | |
| 2015/0136155 | A1* | 5/2015 | Verleur | A24F 40/60 131/328 |
| 2015/0189915 | A1 | 7/2015 | Liu | |
| 2015/0282529 | A1* | 10/2015 | Li | A61M 11/042 131/273 |
| 2015/0342258 | A1* | 12/2015 | Chen | A24F 40/44 131/329 |
| 2016/0120224 | A1 | 5/2016 | Mishra et al. | |
| 2016/0120226 | A1 | 5/2016 | Rado | |
| 2016/0345629 | A1 | 12/2016 | Mironov | |
| 2017/0208866 | A1 | 7/2017 | Liu | |

FOREIGN PATENT DOCUMENTS

| | | | |
|---|---|---|---|
| RU | 2600092 | C2 | 10/2016 |
| RU | 2602053 | C2 | 11/2016 |
| WO | WO-2013/022936 | A1 | 2/2013 |
| WO | WO-2013/034453 | A1 | 3/2013 |
| WO | WO-2013/076098 | A2 | 5/2013 |
| WO | WO-2014/047955 | A1 | 4/2014 |
| WO | WO-2014/110119 | A1 | 7/2014 |
| WO | WO-2014/139609 | A2 | 9/2014 |
| WO | WO-2015/128499 | A1 | 9/2015 |
| WO | WO-2015/179388 | A1 | 11/2015 |
| WO | WO-2016/135342 | A2 | 9/2016 |

OTHER PUBLICATIONS www.reuters.com/article/us-brit-am-tobacco-products-idUSKCN0T71U020151118 <https://protect-us.mimecast.com/s/Jq6bBvC9X01ho> last accessed Dec. 18, 2017.

http://jinjiatech.com/PRODUCTS/Heat/91 <https://protect-us.mimecast.com/s/X8vqBquOLaRfM> last accessed Dec. 18, 2017.

International Search Report issued Mar. 13, 2018 in International Application No. PCT/EP2017/081931.

Written Opinion issued Mar. 13, 2018 in International Application No. PCT/EP2017/081931.

International Preliminary Report and Written Opinion for corresponding PCT Application No. PCT/EP2017/081931 dated Jul. 4, 2019.

Decision to Grant for corresponding Russian Patent Application No. 2019119018, dated Mar. 15, 2021.

Russian Search Report for corresponding Russian Patent Application No. 2019119018, dated Mar. 15, 2021.

Office Action issued Aug. 26, 2021 in Chinese Application No. 201780072717.9.

Japanese Office Action dated Jan. 4, 2022 for corresponding Japanese Patent Application No. 2019-553633.

Japanese Decision to Grant dated Jul. 6, 2022 for corresponding Japanese Patent Application No. 2019-553633.

Notice of Allowance dated Jun. 23, 2023 for corresponding Korean Patent Application No. 10-2019-7014401.

* cited by examiner

VAPOR-GENERATING SYSTEM HAVING AN EXTERNAL CARTRIDGE

CROSS-REFERENCE TO RELATED APPLICATIONS

The present application is a continuation under 35 U.S.C. § 120 of U.S. application Ser. No. 16/915,146, filed on Jun. 29, 2020, which is a continuation of U.S. patent application Ser. No. 15/846,694, filed on Dec. 19, 2017, which is a continuation of, and claims priority to, international application no. PCT/EP2017/081931, filed on Dec. 7, 2017, and further claims priority under 35 U.S.C. § 119 to European Patent Application No. 16205104.9, filed on Dec. 19, 2016, the entire contents of each of which are incorporated herein by reference.

BACKGROUND

Field

Some example embodiments relate to a vapor-generating system comprising a vapor-generating device and a cartridge configured to be received on the vapor-generating device. Some example embodiments find particular application as an electrically operated vaping system.

Description of Related Art

One type of vapor-generating system (also called an “aerosol-generating system”) is an electrically operated vaping system. Known handheld electrically operated vaping systems typically comprise a vapor-generating device comprising a battery, control electronics and an electric heater for heating a vapor-forming substrate. The vapor-forming substrate may be contained within part of the vapor-generating device. For example, the vapor-generating device may comprise a liquid storage portion in which a liquid vapor-forming substrate, such as a nicotine solution, is stored. Such devices, often referred to as ‘e-vapor devices’, typically contain sufficient liquid vapor-forming substrate to provide a quantity of “puffs” equivalent to consuming multiple cigarettes.

In an attempt to provide e-vapor device users (“adult vapers”) with an experience that more closely simulates the experience of consuming a cigarette, some devices combine an e-vapor device configuration with a tobacco-based substrate to be configured to impart a tobacco flavor to the vapor generated by the devices. However, to accommodate the tobacco-based substrate, such devices are typically significantly larger than known devices.

It would be desirable to provide a vapor-generating system comprising multiple vapor-forming substrates and which mitigates or eliminates at least some of these challenges with known devices.

SUMMARY

According to some example embodiments, an aerosol-generating system may include a cartridge including a first aerosol-forming substrate, the cartridge having an annular shape, and an aerosol-generating device. The aerosol-generating device may include a liquid storage section configured to hold a second vapor-forming substrate, the second vapor-forming substrate being a liquid substrate, a power supply section configured to supply electrical power for the aerosol-generating device, a flange structure, and a device air inlet. The liquid storage section may be configured to removably couple with the power supply section such that outer surfaces of the liquid storage section and the power supply section collectively define at least one element of the flange structure and the device air inlet. The cartridge may be configured to couple with the aerosol-generating device such that the cartridge abuts the flange and at least partially overlies the device air inlet.

The device air inlet is on the flange so that the end of the cartridge abuts the device air inlet based on the cartridge abutting the flange.

The device air inlet may be on the outer surface of the aerosol-generating device adjacent the flange so that an inner surface of the cartridge at least partially overlies the device air inlet based on the cartridge abutting the flange.

The aerosol-generating device may further include a first electric heater configured to heat the second aerosol-forming substrate and a second electric heater on an outer surface of the aerosol-generating device. The cartridge may at least partially overlie the second electric heater based on the cartridge being coupled with the aerosol-generating device. The second electric heater may be configured to heat the first aerosol-forming substrate based on the cartridge being coupled with the aerosol-generating device.

The aerosol-generating system may further include a device air outlet and a removable cover configured to engage with the aerosol-generating device and overlay the cartridge based on the aerosol-generating device coupling with the cartridge. The removable cover may include a cover air outlet configured to be in fluid communication with the device air outlet based on the removable cover being engaged with the aerosol-generating device, and a cover air inlet configured to be in fluid communication with the cartridge based on the cartridge being coupled with the aerosol-generating device and the removable cover being engaged with the aerosol-generating device.

An end of the removable cover may be configured to abut the flange based on the removable cover being engaged with the aerosol-generating device.

The cartridge may be a sleeve configured to slide onto a portion of the aerosol-generating device.

The aerosol-generating device may be configured to be overlain by the cartridge between the liquid storage section and the power supply section and the device air inlet is collectively defined by the outer surfaces of the liquid storage section and the power supply section.

The cartridge may be an annular disc shape.

The annular disc shape may be one of a ring shape, a split-ring shape, and a C-shape.

The cartridge may include a porous wrapper overlying at least a portion of the first vapor-forming substrate.

The liquid storage section may be configured to removably couple to the power supply section such that the flange is collectively defined by the outer surfaces of the liquid storage section and the power supply section.

The liquid storage section may be configured to removably couple to the power supply section such that the device air inlet is defined by the outer surfaces of the liquid storage section and the power supply section.

According to some example embodiments, a method of assembling an aerosol-generating system may include removably coupling a liquid storage section to a power supply section. The liquid storage section may include a liquid storage section configured to hold a first vapor-forming substrate. The first vapor-forming substrate may be a liquid substrate. The power supply section may be configured to supply electrical power to the liquid storage section. The removably coupling may include causing outer surfaces of the liquid storage section and the power supply section to collectively define at least one element of a flange and a device air inlet of the aerosol-generating system. The method may further include coupling a cartridge with the aerosol-generating device such that the cartridge abuts the flange and at least partially overlies the device air inlet. The cartridge may include a second vapor-forming substrate. The cartridge may have an annular shape.

The removably coupling may include coupling the liquid storage section and the power supply section such that the device air inlet is on the flange, and the coupling the cartridge may include causing the cartridge to abut the device air inlet based on the cartridge abutting the flange.

The removably coupling may couple the liquid storage section and the power supply section such that the device air inlet is on an outer surface of the aerosol-generating device adjacent the flange, and the coupling the cartridge may include causing an inner surface of the cartridge to at least partially overlie the device air inlet based on the cartridge abutting the flange.

The method may include engaging a removable cover with the aerosol-generating device such that the removable cover overlays the cartridge. The removable cover may include a cover air outlet configured to be in fluid communication with a device air outlet based on the engaging and a cover air inlet configured to be in fluid communication with the cartridge based on the engaging.

The removably coupling couple the liquid storage section and the power supply section such that the flange is collectively defined by the outer surfaces of the liquid storage section and the power supply section.

The removably coupling may couple the liquid storage section and the power supply section such that the device air inlet is collectively defined by the outer surfaces of the liquid storage section and the power supply section.

BRIEF DESCRIPTION OF THE DRAWINGS

Example embodiments will be further described, by way of example only, with reference to the accompanying drawings in which.

DETAILED DESCRIPTION

Figure 1:
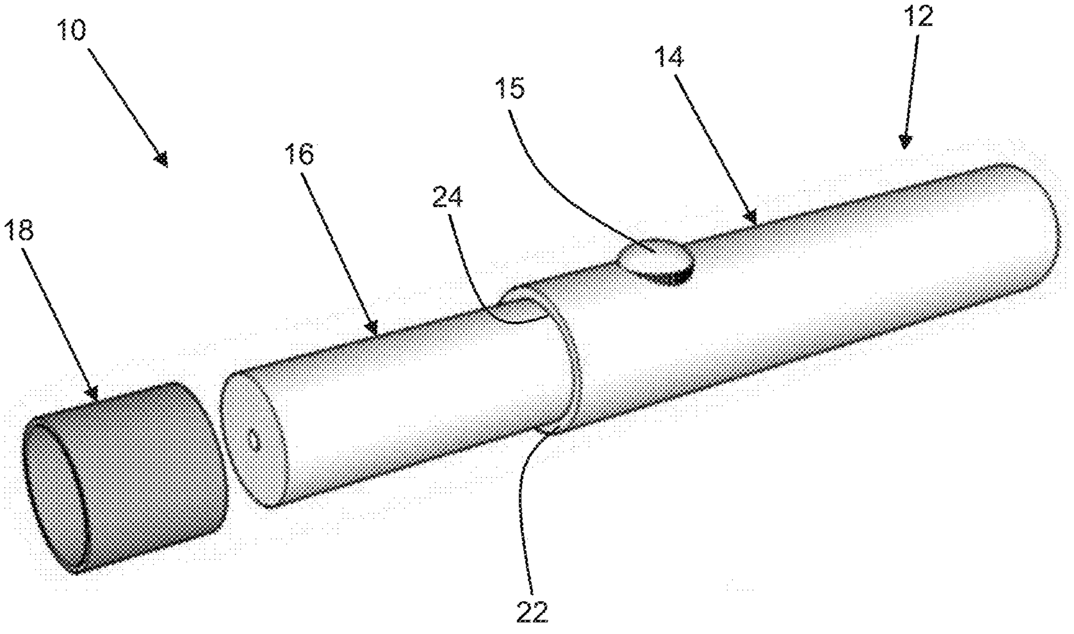
FIG. 1 is a perspective view of an vapor-generating system according to some example embodiments, with the cartridge separated from the vapor-generating device.

Example embodiments will become more readily understood by reference to the following detailed description of the accompanying drawings. Example embodiments may, however, be embodied in many different forms and should not be construed as being limited to the example embodiments set forth herein. Rather, these example embodiments are provided so that this disclosure will be thorough and complete. Like reference numerals refer to like elements throughout the specification.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, and/or elements, but do not preclude the presence or addition of one or more other features, integers, steps, operations, elements, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, regions, layers and/or sections, these elements, regions, layers and/or sections should not be limited by these terms. These terms are only used to distinguish one element, region, layer or section from another region, layer or section. Thus, a first element, region, layer or section discussed below could be termed a second element, region, layer or section without departing from the teachings set forth herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "computer readable storage medium" or "non-transitory computer readable storage medium," may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, at least some portions of example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, processor(s), processing circuit(s), or processing unit(s) may be programmed to perform the necessary tasks, thereby being transformed into special purpose processor(s) or computer(s).

When the terms "about" or "substantially" are used in this specification in connection with a numerical value, it is intended that the associated numerical value include a tolerance of ±10% around the stated numerical value. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure.

According to some example embodiments there is provided a vapor-generating system (also called an "aerosol-generating system"), comprising a cartridge and a vapor-generating device (also called an "aerosol-generating device"). The cartridge comprises a cartridge vapor-forming substrate (also called a "cartridge aerosol-forming substrate" and hereinafter referred to as a "cartridge-based substrate" or "CVS"), the cartridge having an annular shape. The vapor-generating device has a first end, a second end and a length extending between the first end and the second end. The vapor-generating device comprises a liquid storage section comprising a liquid vapor-forming substrate (also called a "liquid aerosol-forming substrate" and hereinafter referred to as a "liquid storage-based substrate" or "LSVS") positioned within the liquid storage portion, and a first electric heater configured to heat the LSVS from the liquid storage section during use of the vapor-generating system. The vapor-generating device further comprises a power supply section comprising a power supply and a controller for controlling a supply of electrical power from the power supply to the first electric heater. The vapor-generating device also comprises a device air inlet positioned between the first end and the second end of the device, and a device air outlet positioned at the second end of the device. The vapor-generating device is configured to receive the cartridge on the vapor-generating device so that the cartridge at least partially overlies the device air inlet.

As used herein, the term "vapor-forming substrate" is used to describe a substrate capable of releasing volatile compounds, which may form a vapor. The vapors generated from vapor-forming substrates of vapor-generating systems according to some example embodiments may be visible or invisible and may include vapors (for example, fine particles of substances, which are in a gaseous state, that are ordinarily liquid or solid at room temperature) as well as gases and liquid droplets of condensed vapors.

Vapor-generating systems according to some example embodiments provide an annular cartridge configured to be received on a vapor-generating device so that the cartridge overlies a device air inlet. Therefore, in use, air is drawn into the vapor-generating device through the cartridge.

Advantageously, this arrangement omits a cartridge-receiving cavity in the vapor-generating device. Omitting a cartridge-receiving cavity may facilitate a vapor-generating device length that is similar to known e-vapor devices. Omitting a cartridge-receiving cavity makes it easier for an adult vaper to engage and disengage the cartridge with the vapor-generating device. In particular, the risk of a cartridge becoming stuck in a cartridge-receiving cavity is eliminated or reduced.

Advantageously, this arrangement facilitates the use of a vapor-generating device that is similar to known e-vapor devices, which may reduce or preclude the modification of existing devices.

In some example embodiments, the vapor-generating system is configured so that the cartridge is retained on the vapor-generating device by an interference fit.

An outer surface of the vapor-generating device may form a flange against which the cartridge is received when the cartridge is received on the vapor-generating device, wherein the device air inlet is positioned proximate the flange. Advantageously, providing a flange against which the cartridge is received may facilitate correct placement of the cartridge on the vapor-generating device by an adult vaper.

The device air inlet may be positioned on the flange so that an end of the cartridge abuts the device air inlet when the cartridge is received against the flange.

The device air inlet may be positioned on the outer surface of the vapor-generating device adjacent the flange so that an inner surface of the cartridge at least partially overlies the device air inlet when the cartridge is received against the flange.

In some example embodiments, the liquid storage section is removable from the power supply section. Advantageously, this facilitates replacement of the liquid storage section (for example, when the LSVS has been depleted) without replacement of the power supply section. The liquid storage section may be configured for removable attachment to the power supply section by at least one of an interference fit, a screw connection and a bayonet connection.

The power supply section may have a first end forming the first end of the vapor-generating device and a second end, wherein the liquid storage section has a first end configured for removable attachment to the second end of the power supply section and a second end forming the second end of the vapor-generating device. In some example embodiments, one of the first end of the liquid storage section and the second end of the power supply section forms the flange when the liquid storage section is attached to the power supply section. An outer dimension of the second end of the power supply section may be larger than an outer dimension of the first end of the liquid storage section. An outer dimension of the first end of the liquid storage section may be larger than an outer dimension of the second end of the power supply section.

The vapor-generating system may further comprise a second electric heater provided on an outer surface of the vapor-generating device, wherein the second electric heater is positioned so that the cartridge at least partially overlies the second electric heater when the cartridge is received on the vapor-generating device. In some example embodiments, the controller is configured to control a supply of electrical power from the power supply to the second electric heater based on receiving the cartridge on the vapor-generating device. Advantageously, providing a second heater configured to heat the cartridge may facilitate the release of volatile compounds from the CVS into the airflow while the vapor-generating system generates vapor (e.g., concurrently with the vapor-generating system generating vapor).

The second heater may comprise a substantially annular heater extending around a portion of the outer surface of the vapor-generating device. The second heater may comprise a plurality of discrete heaters positioned around a portion of the outer surface of the vapor-generating device.

The vapor-generating system may further comprise a removable cover configured to receive at least a portion of the vapor-generating device, wherein the removable cover is configured to overlie the cartridge when the cartridge is received on the vapor-generating device and when the removable cover is engaged with the vapor-generating device.

Advantageously, the removable cover may protect the cartridge when the vapor-generating system is handled by an adult vaper during use. Preventing or hindering an adult vaper touching the cartridge during use may be particularly desirable in some example embodiments in which the vapor-generating system comprises a second heater configured to heat the cartridge.

Advantageously, the removable cover in combination with the vapor-generating device may provide the vapor-generating system with at least one of a visual appearance and external dimensions that are substantially the same as an existing e-vapor device. Advantageously, this may provide compatibility of the vapor-generating system with existing accessories, such as a carry case.

In some example embodiments, the removable cover has a substantially cylindrical shape. The removable cover may be substantially closed at one end. The removable cover may comprise a cover air outlet configured for fluid communication with the device air outlet when the removable cover is engaged with the vapor-generating device. In some example embodiments in which the removable cover is substantially closed at one end, the cover air outlet may be provided on the closed end.

The removable cover may comprise a cover air inlet configured for fluid communication with the cartridge when the cartridge is received on the vapor-generating device and when the removable cover is engaged with the vapor-generating device.

In some example embodiments in which the vapor-generating device comprises a flange, a first end of the removable cover may be configured to abut the flange when the removable cover is engaged with the vapor-generating device. Advantageously, this may facilitate correct placement of the removable cover on the vapor-generating device by an adult vaper.

In some example embodiments, the removable cover is configured to be retained on the vapor-generating device by an interference fit.

The cartridge may form a sleeve configured to slide onto a portion of the vapor-generating device. This arrangement may be particularly suited to some example embodiments in which the vapor-generating device comprises a flange.

In some example embodiments in which the liquid storage section is configured for removable attachment to the power supply section, the cartridge may be configured to be received between the liquid storage section and the power supply section. A connecting portion of one or both of the liquid storage section and the power supply section may extend through the cartridge when the cartridge is received on the vapor-generating device.

The cartridge may form ("be") an annular disc shape. The annular disc shape may be one of a ring shape, a split-ring shape, and a C-shape.

Advantageously, a ring shape may prevent or hinder the cartridge becoming detached from the vapor-generating device while the liquid storage section is attached to the power supply section.

Advantageously, a split-ring shape may facilitate engagement of the cartridge with a connecting portion on the liquid storage section or the power supply section by allowing a small degree of expansion and contraction in the size of the ring.

Advantageously, a C-shape may facilitate engagement and disengagement of the cartridge with the vapor-generating device without separating the liquid storage section from the power supply section. For example, in some example embodiments in which the liquid storage section removably attaches to the power supply section by a screw connection, engagement and disengagement of the cartridge with the vapor-generating device may be facilitated by only partially unscrewing the liquid storage section from the power supply section.

The cartridge may comprise a porous wrapper overlying at least a portion of the CVS. The porous wrapper may substantially encapsulate the CVS. The porous wrapper may comprise at least one of a woven material and a non-woven material. The porous wrapper may comprise a mesh. The porous wrapper may comprise a paper. Advantageously, providing a porous wrapper overlying at least a portion of the CVS may retain the CVS in the desired shape and allow air to flow through the cartridge during use.

The cartridge may comprise a cartridge housing, wherein the CVS is positioned within the cartridge housing. In some example embodiments, the cartridge housing comprises a cartridge air inlet and a cartridge air outlet. The cartridge is configured so that, when the cartridge is engaged with the vapor-generating device, the cartridge air outlet overlies the device air inlet. Each of the cartridge and the vapor-generating device may comprise one or more indicia to indicate to an adult vaper the rotational orientation of the cartridge with respect to the vapor-generating device. Advantageously, this may assist an adult vaper in aligning the cartridge air outlet with the device air inlet.

The cartridge housing may be formed from any suitable material or combination of materials. Suitable materials include, but are not limited to, aluminum, polyether ether ketone (PEEK), polyimides, such as Kapton®, polyethylene terephthalate (PET), polyethylene (PE), high-density polyethylene (HDPE), polypropylene (PP), polystyrene (PS), fluorinated ethylene propylene (FEP), polytetrafluoroethylene (PTFE), polyoxymethylene (POM), epoxy resins, polyurethane resins, vinyl resins, liquid crystal polymers (LCP) and modified LCPs, such as LCPs with graphite or glass fibers.

The vapor-generating system may comprise a removable wrapper enclosing the cartridge. The removable wrapper is removed from the cartridge prior to use of the cartridge with the vapor-generating device. In some example embodiments, the removable wrapper comprises a non-porous material. The removable wrapper may comprise a polymeric material, such as a polymeric film. The removable wrapper may comprise a laminate of two or more different materials. The removable wrapper may comprise a metallized polymeric film.

The first electric heater may be provided separately from both the liquid storage section and the power supply section, wherein the first electric heater is configured for removable attachment to at least one of the liquid storage section and the power supply section.

The first electric heater may be part of one of the power supply section and the liquid storage section.

In some example embodiments, the first electric heater and liquid storage section are provided together in a vaporizer section of the vapor-generating device. In some example embodiments in which the liquid storage section is configured for removable attachment to the power supply section, the vaporizer section is configured for removable attachment to the power supply section.

The CVS may comprise a solid vapor-forming substrate. The solid vapor-forming substrate may comprise tobacco. The solid vapor-forming substrate may comprise a tobacco-containing material ("tobacco material") containing volatile tobacco flavor compounds which are released from the substrate upon heating.

In some example embodiments, a tobacco material may include material from any member of the genus *Nicotiana*. In some example embodiments, the tobacco material includes a blend of two or more different tobacco varieties. Examples of suitable types of tobacco materials that may be used include, but are not limited to, flue-cured tobacco, Burley tobacco, Maryland tobacco, Oriental tobacco, rare tobacco, specialty tobacco, dark tobacco, blends thereof and the like. The tobacco material may be provided in any suitable form, including, but not limited to, tobacco lamina, processed tobacco materials, such as volume expanded or puffed tobacco, processed tobacco stems, such as cut-rolled or cut-puffed stems, reconstituted tobacco materials, blends thereof, and the like. In some example embodiments, the tobacco material is in the form of a substantially dry tobacco mass.

The solid vapor-forming substrate may comprise tobacco containing deprotonated nicotine. Deprotonating the nicotine within tobacco may advantageously increase the volatility of the nicotine. Nicotine may be deprotonated by subjecting the tobacco to an alkalizing treatment.

The solid vapor-forming substrate may comprise a non-tobacco material. The solid vapor-forming substrate may comprise tobacco-containing material and non-tobacco containing material.

The solid vapor-forming substrate may include at least one vapor-former. As used herein, the term 'vapor former' (also called an 'aerosol former') is used to describe any suitable known compound or mixture of compounds that, in use, facilitates formation of a vapor. Suitable vapor-formers include, but are not limited to: polyhydric alcohols, such as propylene glycol, triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate.

In some example embodiments, the vapor formers are polyhydric alcohols or mixtures thereof, such as propylene glycol, triethylene glycol, 1,3-butanediol and glycerine.

The solid vapor-forming substrate may comprise a single vapor former. In some example embodiments, the solid vapor-forming substrate may comprise a combination of two or more vapor formers.

The solid vapor-forming substrate may have a vapor former content of greater than 5 percent on a dry weight basis.

The solid vapor-forming substrate may have a vapor former content of between approximately 5 percent and approximately 30 percent on a dry weight basis.

The solid vapor-forming substrate may have a vapor former content of approximately 20 percent on a dry weight basis.

The LSVS of the liquid storage section may comprise a liquid vapor-forming substrate (hereinafter referred to as a "liquid LSVS") including a tobacco-containing material comprising volatile tobacco flavor compounds which are released from the liquid upon heating. The liquid LSVS may comprise a non-tobacco material. The liquid LSVS may include water, solvents, ethanol, plant extracts and natural or artificial flavors. In some example embodiments, the liquid LSVS comprises a vapor former. Suitable vapor formers include polyhydric alcohols or mixtures thereof, such as propylene glycol, triethylene glycol, 1,3-butanediol and glycerine.

The liquid LSVS in the liquid storage section may comprise nicotine.

The liquid LSVS may be free from nicotine.

The liquid storage section may comprise a porous carrier material, wherein the liquid LSVS is provided on the porous carrier material. Advantageously, providing the liquid LSVS on a porous carrier material may reduce the risk of the liquid LSVS leaking from the liquid storage section.

The porous carrier material may comprise any suitable material or combination of materials which is permeable to the liquid LSVS and allows the liquid LSVS to migrate through the porous carrier material. In some example embodiments, the material or combination of materials is inert with respect to the liquid LSVS. The porous carrier material may or may not be a capillary material. The porous carrier material may comprise a hydrophilic material to improve distribution and spread of the liquid LSVS. This may assist with consistent vapor formation. In some example embodiments, the particular material or materials used will depend on the physical properties of the liquid LSVS. Examples of suitable materials are a capillary material, for example a sponge or foam material, ceramic- or graphite-based materials in the form of fibers or sintered powders, a foamed metal or plastics material, a fibrous material, for example made of spun or extruded fibers, such as cellulose acetate, polyester, or bonded polyolefin, polyethylene, terylene or polypropylene fibers, nylon fibers or ceramic. The porous carrier material may have any suitable porosity so as to be used with different liquid physical properties.

The CVS may comprise a liquid vapor-forming substrate (hereinafter referred to as a "liquid CVS"). The liquid CVS may be provided on a porous carrier material positioned within the cartridge. Suitable liquid vapor-forming substrates include those described herein with respect to the liquid LSVS. Suitable porous carrier materials include those described herein with respect to the liquid LSVS. In some example embodiments, the liquid CVS provided in the cartridge is different to the liquid LSVS provided in the liquid storage section of the vapor-generating device.

The vapor-generating system may further comprise a liquid transfer element configured so that, in use, the liquid LSVS is transported by capillary action along the liquid transfer element from the liquid storage section to the electric heater. In some example embodiments in which the liquid storage section comprises a porous carrier material, the liquid transfer element is configured to transport the liquid LSVS from the porous carrier material to the electric heater.

The liquid transfer element may comprise any suitable material or combination of materials which is able to convey the liquid LSVS along its length. The liquid transfer element may be formed from a porous material, but this need not be the case. The liquid transfer element may be formed from a material having a fibrous or spongy structure. The liquid transfer element may comprise a bundle of capillaries. For example, the liquid transfer element may comprise a plurality of fibers or threads or other fine bore tubes. The liquid transfer element may comprise sponge-like or foam-like material. In some example embodiments, the structure of the liquid transfer element forms a plurality of small bores or tubes, through which the liquid LSVS may be transported by capillary action. In some example embodiments, the particular material or materials used will depend on the physical properties of the liquid LSVS. Examples of suitable capillary materials include a sponge or foam material, ceramic- or graphite-based materials in the form of fibers or sintered powders, foamed metal or plastics material, a fibrous material, for example made of spun or extruded fibers, such as cellulose acetate, polyester, or bonded polyolefin, polyethylene, terylene or polypropylene fibers, nylon fibers, ceramic, glass fibers, silica glass fibers, carbon fibers, metallic fibers of medical grade stainless steel alloys such as austenitic 316 stainless steel and martensitic 440 and 420 stainless steels. The liquid transfer element may have any suitable capillarity so as to be used with different liquid physical properties. The liquid LSVS has physical properties, including but not limited to viscosity, surface tension, density, thermal conductivity, boiling point and vapor pressure, which allow the liquid LSVS to be transported through the liquid transfer element. The liquid transfer element may be formed from heat-resistant material. The liquid transfer element may comprise a plurality of fiber strands. The plurality of fiber strands may be generally aligned along a length of the liquid transfer element.

In some example embodiments in which the liquid storage section comprises a porous carrier material, the porous carrier material and the liquid transfer element may comprise the same material. In some example embodiments, the porous carrier material and the liquid transfer element comprise different materials.

The first electric heater may comprise a resistive heating coil.

The first electric heater may comprise a resistive heating mesh.

The resistive heating mesh may comprise a plurality of electrically conductive filaments. The electrically conductive filaments may be substantially flat. As used herein, "substantially flat" means formed in a single plane and not wrapped around or otherwise conformed to fit a curved or other non-planar shape. A flat heating mesh may be easily handled during manufacture and provides for a robust construction.

The electrically conductive filaments may define interstices between the filaments and the interstices may have a width of between about 10 micrometers and about 100 micrometers. In some example embodiments, the filaments give rise to capillary action in the interstices, so that in use, liquid LSVS is drawn into the interstices, increasing the contact area between the heater assembly and the liquid.

The electrically conductive filaments may form a mesh of size between about 160 Mesh US and about 600 Mesh US (+/−10%) (that is, between about 160 and about 600 filaments per inch (+/−10%)). The width of the interstices may be between about 75 micrometers and about 25 micrometers. The percentage of open area of the mesh, which is the ratio of the area of the interstices to the total area of the mesh may be between about 25 percent and about 56 percent. The mesh may be formed using different types of weave or lattice structures. The electrically conductive filaments may be an array of filaments arranged parallel to one another.

In some example embodiments, the electrically conductive filaments may have a diameter of between about 8 micrometers and about 100 micrometers. In one example, the electrically conductive filaments may have a diameter between about 8 micrometers and about 50 micrometers. In another example, the electrically conductive filaments may have a diameter between about 8 micrometers and about 39 micrometers.

The resistive heating mesh may cover an area of less than or equal to about 25 square millimeters. The resistive heating mesh may be rectangular. The resistive heating mesh may be square. The resistive heating mesh may have dimensions of about 5 millimeters by about 2 millimeters.

The electrically conductive filaments may comprise any suitable electrically conductive material. Suitable materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, constantan, nickel-, cobalt-, chromium-, aluminum- titanium- zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminum based alloys and iron-manganese-aluminum based alloys. Timetal® is a registered trade mark of Titanium Metals Corporation. The filaments may be coated with one or more insulators. In some example embodiments, materials for the electrically conductive filaments may be 304, 316, 304L, and 316L stainless steel, and graphite.

In some example embodiments, the electrical resistance of the resistive heating mesh may be between about 0.3 and about 4 Ohms. In one example, the electrical resistance of the mesh may be between about 0.5 and about 3 Ohms. In another example, the electrical resistance of the mesh may be about 1 Ohm.

In some example embodiments in which the first electric heater comprises a resistive heating coil, the pitch of the coil may be between about 0.5 millimeters and about 1.5 millimeters. In some example embodiments, the pitch of the coil may be about 1.5 millimeters. The pitch of the coil means the spacing between adjacent turns of the coil. The coil may comprise fewer than six turns, and may have fewer than five turns. The coil may be formed from an electrically resistive wire having a diameter of between about 0.10 millimeters and about 0.15 millimeters. In some example embodiments, the electrically resistive wire may have a diameter of about 0.125 millimeters. The electrically resistive wire may be formed of 904 or 301 stainless steel. Examples of other suitable metals include titanium, zirconium, tantalum and metals from the platinum group. Examples of other suitable metal alloys include, Constantan®, nickel-, cobalt-, chromium-, aluminum- titanium- zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminum based alloys and iron-manganese-aluminum based alloys. The resistive heating coil may also comprise a metal foil, such as an aluminum foil, which is provided in the form of a ribbon.

In some example embodiments in which the vapor-generating system comprises a second electric heater provided on an outer surface of the vapor-generating device, the second electric heater may comprise any of the heaters described herein with respect to the first electric heater.

The second electric heater may comprise a heating film, such as a flexible heating film. Advantageously, a heating film, and in particular a flexible heating film, may facilitate conformation of the second electric heater to the shape of the outer surface of the vapor-generating device.

The power supply may comprise a battery. For example, the power supply may be a nickel-metal hydride battery, a nickel cadmium battery, or a lithium based battery, for example a lithium-cobalt, a lithium-iron-phosphate or a lithium-polymer battery. In some example embodiments, the power supply may be another form of charge storage device such as a capacitor. The power supply may be recharged and may have a capacity that allows for the storage of enough energy for use of the vapor-generating device with more than one cartridge assembly.

Figure 2:
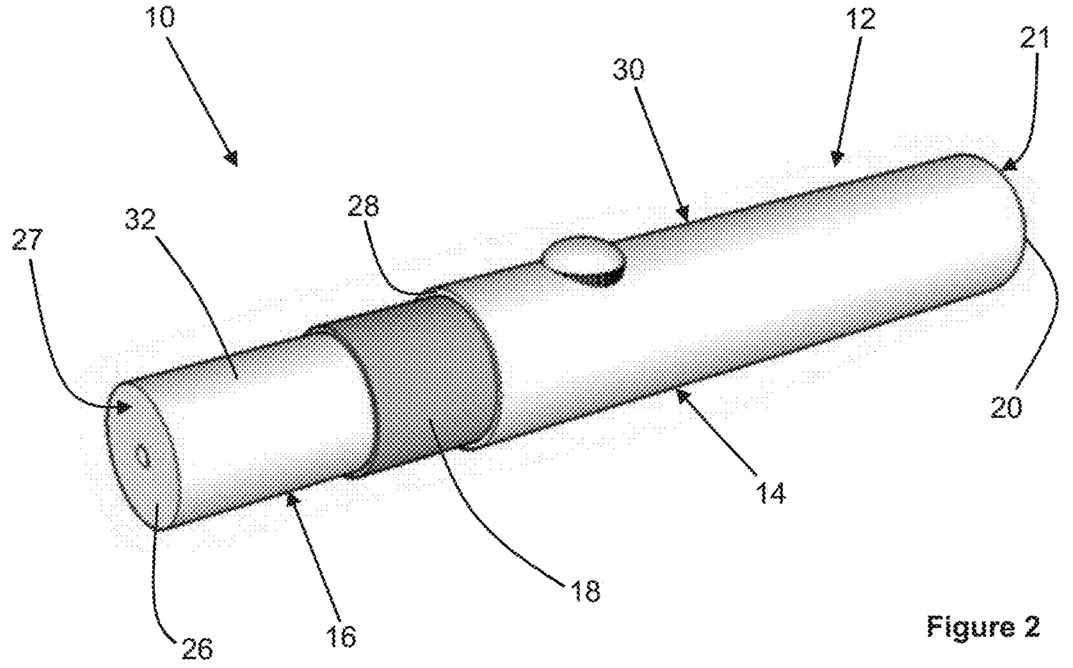
FIG. 2 is a perspective view of the vapor-generating system of FIG. 1, with the cartridge received on the vapor-generating device.

FIGS. 1 and 2 show perspective views of a vapor-generating system 10 according to some example embodiments. The vapor-generating system 10 comprises a vapor-generating device 12 comprising a power supply section 14 and a vaporizer section 16. The power supply section 14 comprises a button 15 for activating the vapor-generating device 12.

The power supply section 14 comprises a first end 20 defining a first end 21 of the vapor-generating system and a second end 22. The vaporizer section 16 comprises a first end 24 configured for removable attachment to the second end 22 of the power supply section 14, and a second end 26 defining a second end 27 of the vapor-generating system 10. A diameter of the second end 22 of the power supply section 14 is larger than a diameter of the first end 24 of the vaporizer section 16 so that a portion of the second end 22 of the power supply section 14 forms a flange 28 (also called a "flange structure" herein).

Thus, as shown in FIGS. 1-2, and as further shown in at least FIGS. 3-6, vapor-generating device 12 may include a vaporizer section 16 (also called a liquid storage section) configured to hold a second vapor-forming substrate (e.g., the LSVS 58 as described herein), where the second vapor-forming substrate may be a liquid substrate, a power supply section 14 configured to supply electrical power for the vapor-generating device 12 (e.g., supply power to the vaporizer section 16 (liquid storage section)), a flange 28 (flange structure), and a device air inlet 46.

The vapor-generating system 10 further comprises a cartridge 18 configured to be received on an outer surface 30 of the vapor-generating device 12. In particular, the cartridge 18 has an annular shape and may be a sleeve configured to slide over an outer surface 32 of the vaporizer section 16 until an end of the cartridge 18 abuts the flange 28, as shown in FIG. 2.

Thus, as shown in FIGS. 1-2 and as further shown in at least FIGS. 3-6, cartridge 18 may include a first aerosol-forming substrate (e.g., the CVS 42 as described herein), and the cartridge 18 may have an annular shape.

Figure 7:
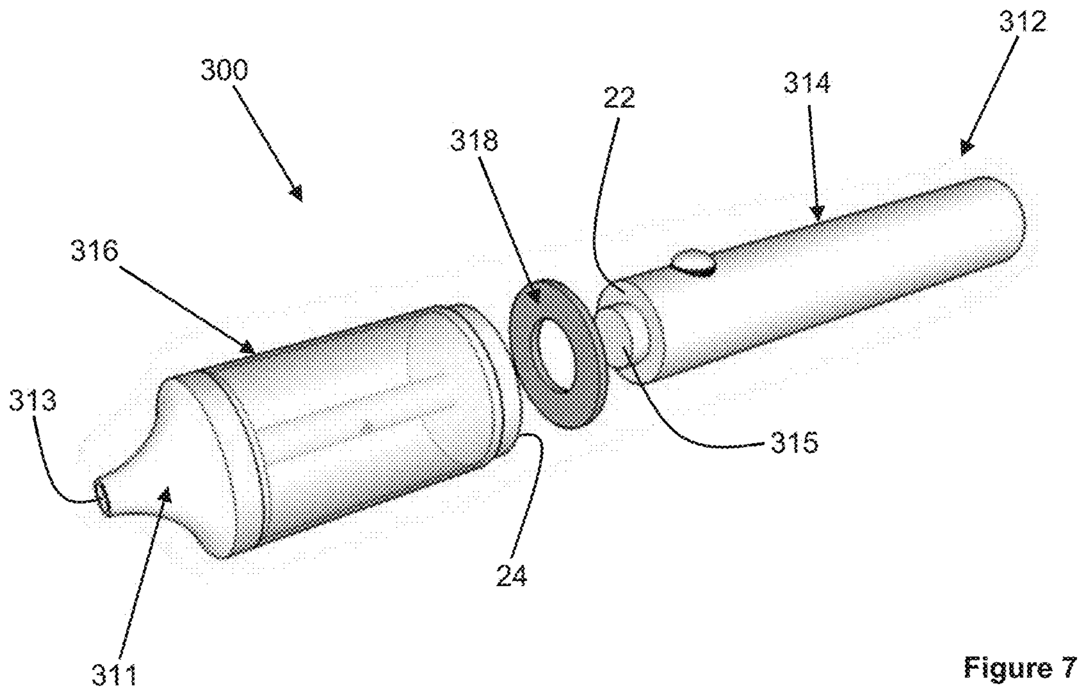
FIG. 7 is a perspective view of an vapor-generating system according to some example embodiments.
Figure 8:
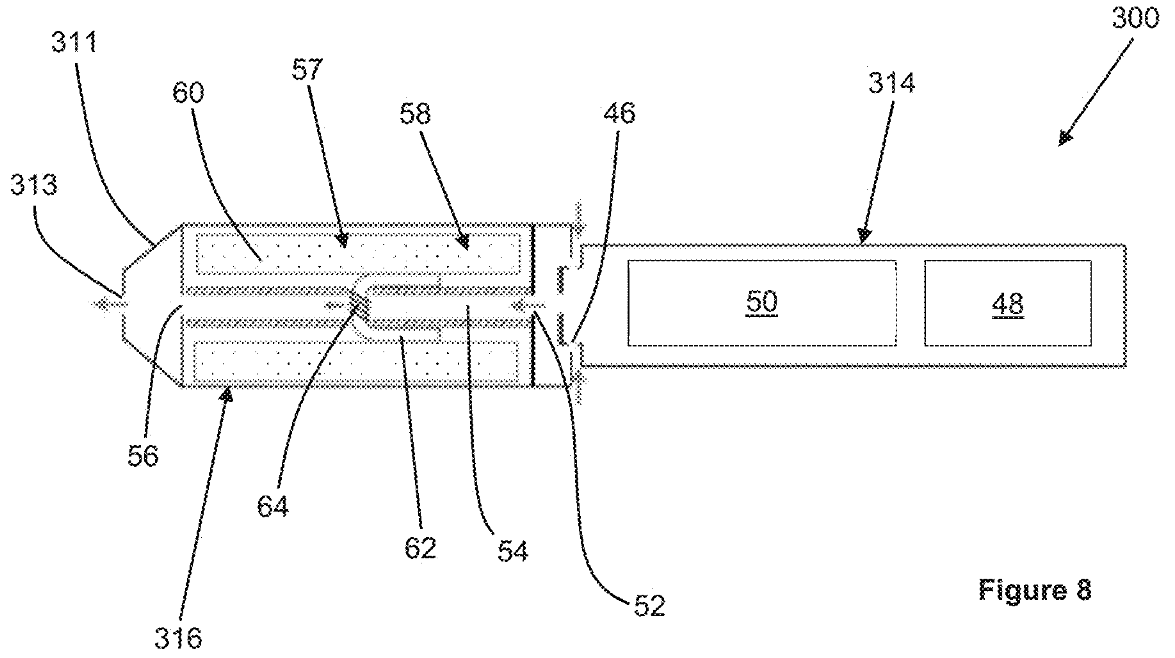
FIG. 8 is a cross-sectional view of the vapor-generating device of FIG. 7.
Figure 9:
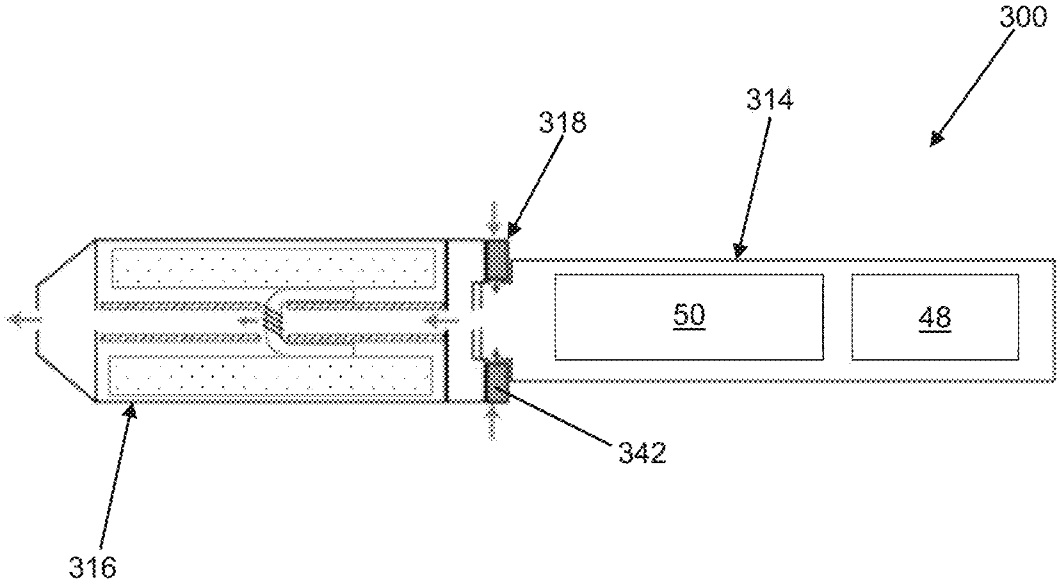
FIG. 9 is a cross-sectional view of the vapor-generating system of FIG. 7, with the cartridge received on the vapor-generating device.

In some example embodiments, the vaporizer section 16 (liquid storage section) is configured to removably couple with the power supply section 14 such that outer surfaces 32 and 30 of the vaporizer section 16 and the power supply section 14, respectively, collectively define at least one element of the flange 28 and the device air inlet 46. For example, FIGS. 1-6 illustrate some example embodiments wherein the vaporizer section 16 (liquid storage section) is configured to removably couple with the power supply section 14 such that outer surfaces 32 and 30 of the vaporizer section 16 and the power supply section 14, respectively, collectively define the flange 28. In another example, FIGS. 7-9 illustrate some example embodiments wherein the vaporizer section 316 (liquid storage section) is configured to removably couple with the power supply section 314 such that outer surfaces of the vaporizer section 316 and the power supply section 314, respectively, collectively define the device air inlet 46.

The removably coupling of the vaporizer section 16 with the power supply section 14 may be referred to herein as removably coupling a vaporizer section 16 to a power supply section 16 to form an aerosol-generating device 12, such that the removably coupling includes causing outer surfaces 32 and 30 of the vaporizer section 16 and the power supply section 14, respectively to collectively define at least one element of a flange 28 and a device air inlet 46 of the aerosol-generating device 12.

In some example embodiments, the cartridge 18, 318 is configured to couple with the aerosol-generating device 12, 312, etc. such that the cartridge 18, 318 abuts the flange 28 and at least partially overlies the device air inlet 46.

Figure 3:
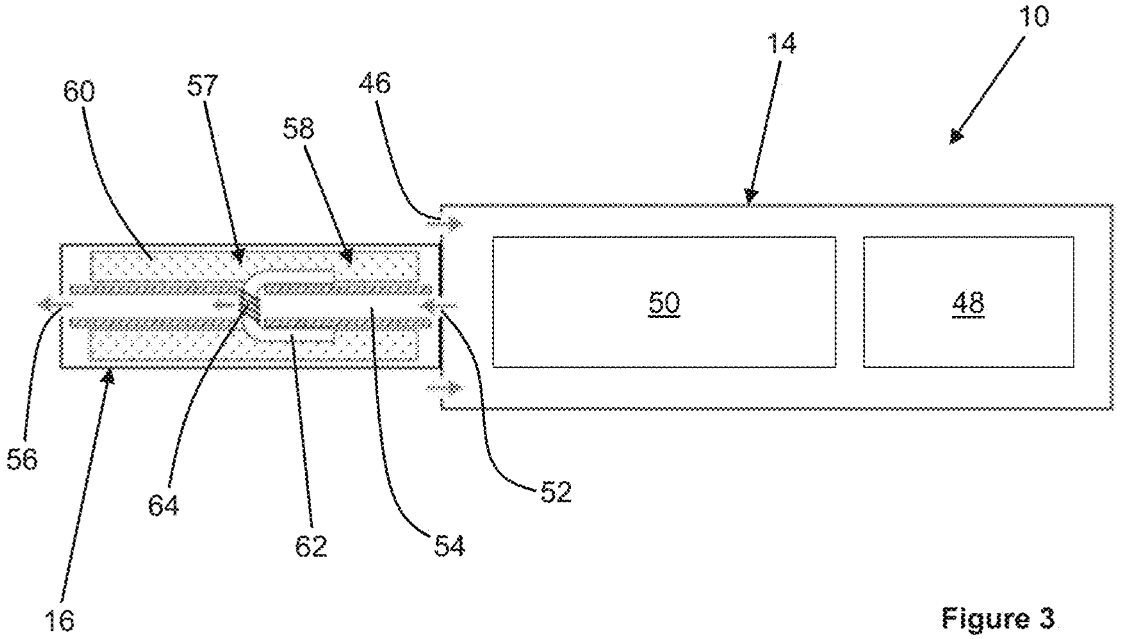
FIG. 3 is a cross-sectional view of the vapor-generating device of FIG. 1.

FIG. 3 shows a cross-sectional view of the vapor-generating device 12. The power supply section 14 defines a device air inlet 46 for admitting air into the power supply section 14, a controller 48 and a power supply 50. The device air inlet 46 is positioned on the flange 28.

The vaporizer section 16 comprises a vaporizer air inlet 52 for receiving air from the power supply section 14, an airflow passage 54 in fluid communication with the vaporizer air inlet 52 at its upstream end, and a device air outlet 56 in fluid communication with the downstream end of the airflow passage 54.

The vaporizer section 16 further comprises a liquid storage section 57 comprising a liquid aerosol-forming substrate (e.g., LSVS) 58 absorbed into an annular porous carrier material 60 positioned outside of the airflow passage 54. A liquid transfer element 62 comprising a capillary wick has first and second ends positioned in contact with the porous carrier material 60 and a central portion positioned within the airflow passage 54. LSVS 58 is wicked by capillary action along the capillary wick from the porous carrier material 60 to the central portion of the capillary wick. As referred to herein the LSVS 58 may be referred to herein as a "second aerosol-forming substrate," a "second vapor-forming substrate," or the like.

The vaporizer section 16 also comprises a first electric heater 64 comprising a resistive heating coil wound around the central portion of the capillary wick. During operation of the vapor-generating system 10, the controller 48 controls a supply of electrical energy from the power supply 50 to the first electric heater 64 to heat and vaporize liquid LSVS 58 from the central portion of the capillary wick.

Figure 4:
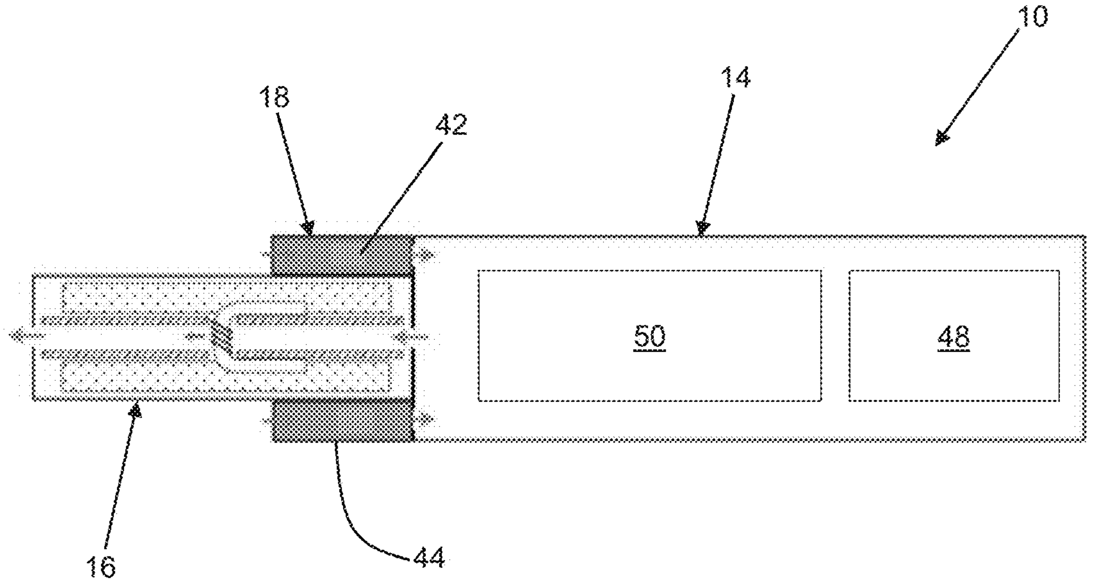
FIG. 4 is a cross-sectional view of the vapor-generating system of FIG. 1, with the cartridge received on the vapor-generating device.

When the cartridge 18 is received on the vapor-generating device 12, as shown in FIG. 4, the cartridge 18 abuts the flange 28 and overlies the device air inlet 46. The cartridge 18 comprises a CVS 42 wrapped in a porous wrapper 44 (e.g., the porous wrapper 44 is overlying at least a portion of the CVS 42) so that, during use, air may flow through the cartridge 18 and into the device air inlet 46. As described herein, the CVS 42 may be referred to as a "first vapor-forming substrate," a "first aerosol-forming substrate," or the like. As shown in FIGS. 3-4, the device air inlet 46 may be on the flange 28 so that the end of the cartridge 18 abuts the device air inlet 46 based on the cartridge abutting the flange 28. In some example embodiments, including the example embodiments shown in FIGS. 7-9, the device air inlet 46 is on the outer surface of the aerosol-generating device adjacent the flange 28 so that an inner surface of the cartridge 318 at least partially overlies the device air inlet 46 based on the cartridge 318 abutting the flange 28.

During operation of the vapor-generating system 10, air is drawn into the vapor-generating system 10 through the cartridge 18 where volatile compounds from the CVS 42 are entrained in the airflow. The airflow then flows through the device air inlet 46, through the vaporizer air inlet 52 and into the airflow passage 54 where vaporized liquid LSVS 58 is entrained in the airflow. The airflow then flows out of the vapor-generating system 10 through the device air outlet 56 to deliver to the adult vaper the vaporized liquid LSVS 58 and the volatile compounds from the CVS 42.

Figure 5:
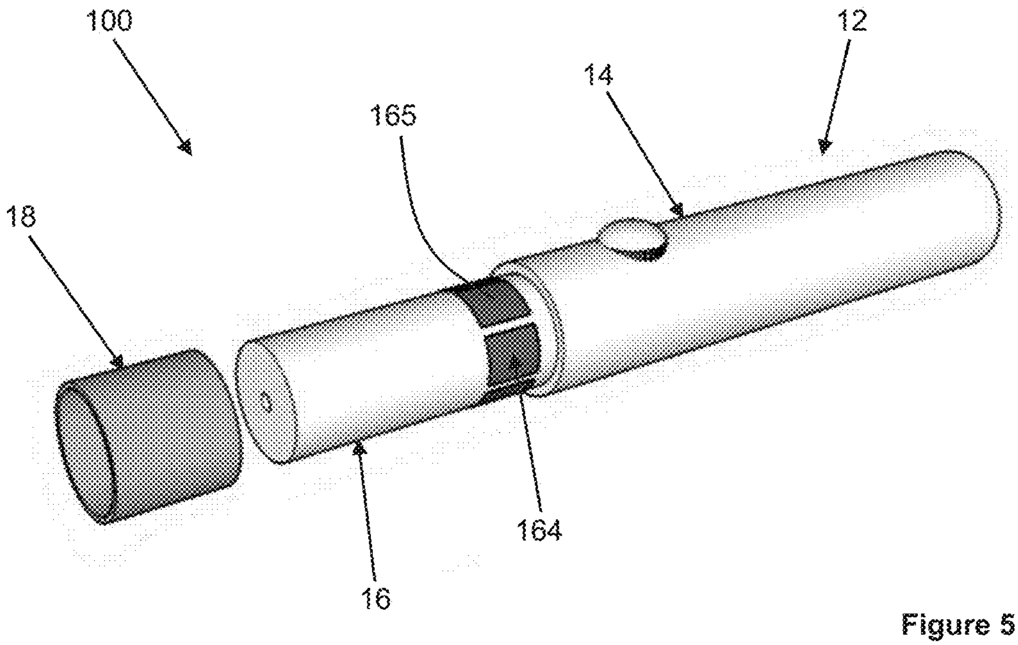
FIG. 5 is a perspective view of an vapor-generating system according to some example embodiments.

FIG. 5 shows a vapor-generating system 100 according to some example embodiments. The vapor-generating system 100 is substantially the same as the vapor-generating system 10 shown in FIGS. 1 to 4, and like reference numerals are used to designate like parts.

The vapor-generating system 100 differs only by the addition of a second electric heater 164 on the outer surface 32 of the vaporizer section 16 of the vapor-generating device 12. The second electric heater 164 comprises a plurality of discrete flexible film heaters 165. During use, the cartridge 18 overlies the second electric heater 164 and the controller 48 controls a supply of electrical energy from the power supply 50 to the second electric heater 164 to heat the cartridge 18. Heating the cartridge 18 advantageously facilitates the release of volatile compounds from the CVS 42. Restated, the cartridge 18 may at least partially overlie the second electric heater 64 based on the cartridge 18 being coupled with the aerosol-generating device 12, where the second electric heater 64 may be configured to heat the first aerosol-forming substrate (e.g., CVS 42) based on the cartridge 18 being coupled with the aerosol-generating device 12.

Figure 6:
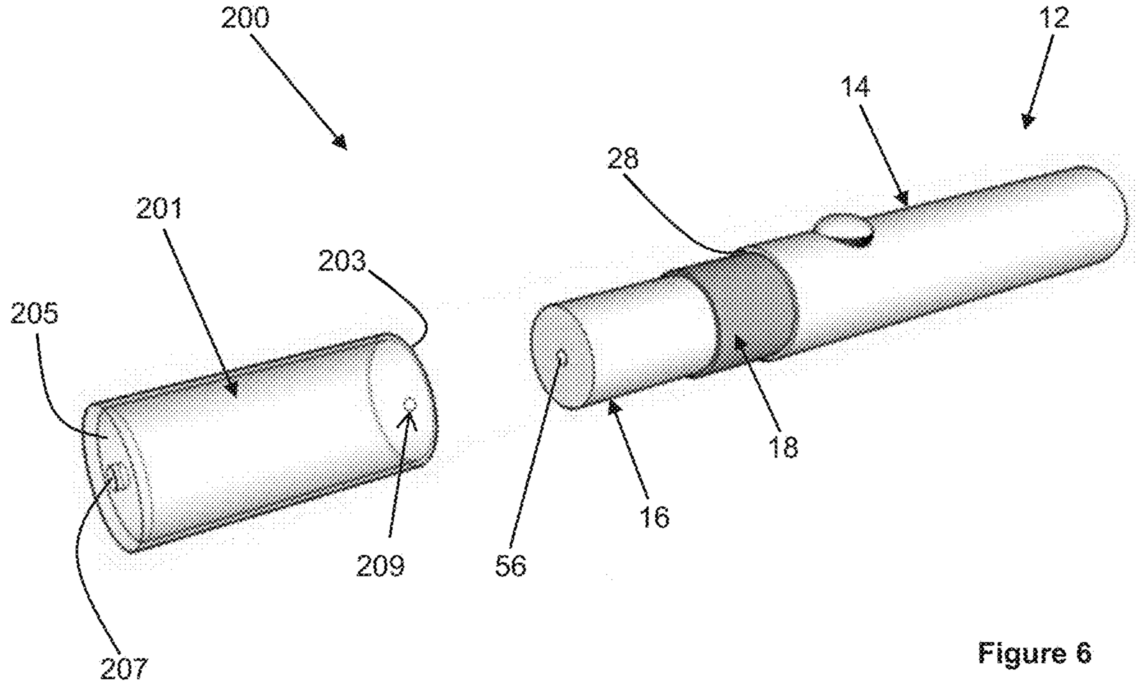
FIG. 6 is a perspective view of an vapor-generating system according to some example embodiments.

FIG. 6 shows a vapor-generating system 200 according to some example embodiments. The vapor-generating system 200 is substantially the same as the vapor-generating systems 10 and 100 shown in FIGS. 1 to 5, and like reference numerals are used to designate like parts.

The vapor-generating system 200 differs only by the addition of a removable cover 201. The removable cover 201 is configured to slide over the vaporizer section 16 and the cartridge 18 to cover the cartridge 18 during use of the vapor-generating system 200. An end of the removable cover 201 (e.g., upstream end 203) may be configured to abut the flange 28 based on the removable cover 201 being engaged with the vapor-generating device 12. A downstream end 205 of the removable cover 201 is closed and comprises a cover air outlet 207 configured to overlie the device air outlet 56. The removable cover 201 may comprise a cover air inlet 209 configured to be in fluid communication with the cartridge 18 based on the cartridge 18 being coupled with the aerosol-generating device 12 and the removable cover 201 being engaged with the aerosol-generating device 12. During use, the removable cover 201 is retained on the vapor-generating device 12 by an interference fit.

FIGS. 7 to 9 show a vapor-generating system 300 according to some example embodiments. The vapor-generating system 300 is similar to the vapor-generating system 10 shown in FIGS. 1 to 4, and like reference numerals are used to designate like parts.

As described above, and as shown in FIGS. 7-9, in some example embodiments outer surfaces of the power supply section 314 and the vaporizer section 316 may collectively define a device air inlet 46 based on the vapor-generating device 312 coupling with the vaporizer section 316, and the aerosol-generating device 312 may be configured to be overlain by the cartridge 318 between the vaporizer section 316 and the power supply section 314.

The vapor-generating system 300 comprises a vapor-generating device 312 having a power supply section 314 and a vaporizer section 316 configured for removable attachment to each other by a screw connection. The power supply section 314 comprises a male screw connector 315 configured to attach to a female screw connector on the vaporizer section 316. The male screw connector 315 may, together with a remainder of a second end 22 of the power supply section 314, define the flange 28 as a structure at the second end of the power supply section 314. The vapor-generating system 300 is configured so that, when the male screw connector 315 is fully inserted into the female screw connector, the second end 22 of the power supply section 314 is spaced apart from the first end 24 of the vaporizer section 316 to define the device air inlet 46 therebetween.

The vapor-generating system 300 comprises a cartridge 318 in the form of an annular ring. The cartridge 318 is configured to be received on the male screw connector 315 and sandwiched between the second end 22 of the power supply section 314 and the first end 24 of the vaporizer section 316 so that the cartridge 318 overlies the device air inlet 46.

The vaporizer section 316 further comprises a mouthpiece (outlet assembly) 311 at the second end of the vaporizer section, the outlet assembly 311 comprising an outlet assembly air outlet 313 in fluid communication with the device air outlet.

The operation of the vapor-generating system 300 is substantially the same as the operation of the vapor-generating system 10 shown in FIGS. 1 to 4. During use, air is drawn into the vapor-generating system 300 through the cartridge 318 where volatile compounds from the CVS 342 are entrained in the airflow. The airflow then flows through the device air inlet 46, through the vaporizer air inlet 52 and into the airflow passage 54 where vaporized liquid LSVS 58 is entrained in the airflow. The airflow then flows out of the vapor-generating system 300 through the device air outlet 56 and the outlet assembly air outlet 313 to deliver to the adult vaper the vaporized liquid LSVS 58 and the volatile compounds from the CVS 342.

Figure 10:
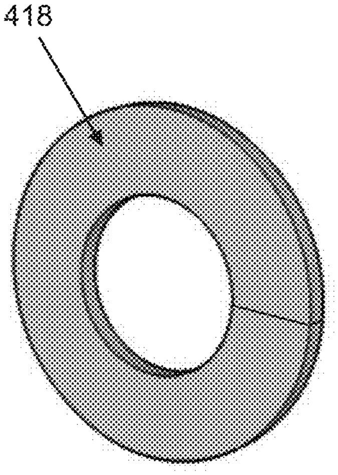
FIG. 10 is a perspective view of a cartridge according to some example embodiments.

FIG. 10 shows a cartridge 418 according to some example embodiments. The cartridge 418 is substantially the same as the cartridge 318 shown in FIGS. 7 to 9, except the cartridge 418 has a split-ring shape, which may facilitate engagement and disengagement of the cartridge 418 with a vapor-generating device. The cartridge 418 may be used with the vapor-generating device 312 shown in FIGS. 7 to 9.

Figure 11:
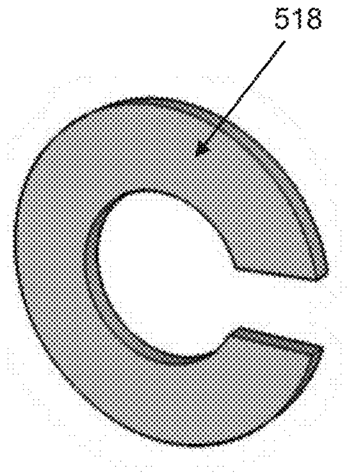
FIG. 11 is a perspective view of a cartridge according to some example embodiments.

FIG. 11 shows a cartridge 518 according to some example embodiments. The cartridge 518 is substantially the same as the cartridge 318 shown in FIGS. 7 to 9, except the cartridge 518 has a C-shape, which may facilitate engagement and disengagement of the cartridge 518 with a vapor-generating device. The cartridge 518 may be used with the vapor-generating device 312 shown in FIGS. 7 to 9.

As shown in FIGS. 10-11, the cartridge (418, 518, etc.) may form ("be") an annular disc shape. The annular disc shape may be one of a ring shape, a split-ring shape (e.g., as shown in at least FIG. 10), and a C-shape (e.g., as shown in at least FIG. 11).

Figure 12:
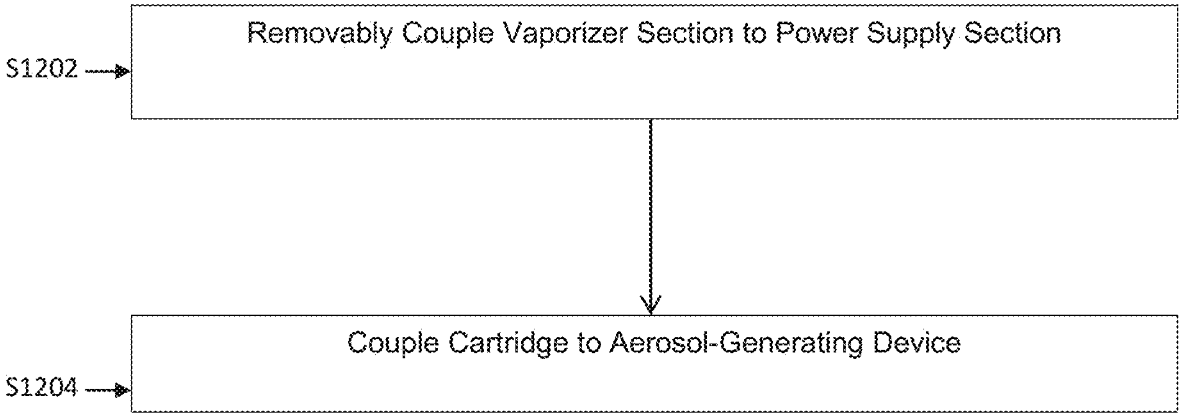
FIG. 12 shows a method of assembling a vapor-generating system, according to some example embodiments.

FIG. 12 shows a method of assembling a vapor-generating system, according to some example embodiments. The method may be performed using components similar to or the same as those discussed in association with FIGS. 1-11. Repeated descriptions already given above with reference to FIGS. 1-11 will be omitted.

In operation S1202, a vaporizer section ("liquid storage section") is removably coupled ("attached") to the power supply section such that at least one of the flange and the device air inlet is collectively defined by outer surfaces of the vaporizer section and the power supply section. Restated, operation S1202 may include removably coupling a vaporizer section to a power supply section to form an aerosol-generating device, the vaporizer section configured to hold a first aerosol-forming substrate, the first aerosol-forming substrate being a liquid substrate, the power supply section configured to supply electrical power to the vaporizer section, the removably coupling including causing outer surfaces of the vaporizer section and the power supply section to collectively define at least one element of a flange and a device air inlet of the aerosol-generating device.

In some example embodiments, the power supply section may have a first end forming the first end of the vapor-generating device and a second end, wherein the vaporizer section has a first end configured for removable attachment to the second end of the power supply section and a second end forming the second end of the vapor-generating device. In some example embodiments, one of the first end of the vaporizer section and the second end of the power supply section forms the flange when the vaporizer section is attached to the power supply section.

In some example embodiments, the removably coupling at operation S1202 couples the vaporizer section and the power supply section such that the device air inlet is on the flange, and the coupling the cartridge includes causing the cartridge to abut the device air inlet based on the cartridge abutting the flange.

In some example embodiments, the removably coupling at operation S1202 couples the vaporizer section and the power supply section such that the device air inlet is on an outer surface of the aerosol-generating device adjacent the flange, and the coupling the cartridge includes causing an inner surface of the cartridge to at least partially overlie the device air inlet based on the cartridge abutting the flange.

In some example embodiments, the removably coupling at operation S1202 couples the vaporizer section and the power supply section such that the flange is collectively defined by the outer surfaces of the vaporizer section and the power supply section.

In some example embodiments, the removably coupling at operation S1202 couples the vaporizer section and the power supply section such that the device air inlet is collectively defined by the outer surfaces of the vaporizer section and the power supply section.

In operation S1204, the cartridge is coupled to (e.g., overlaid on) the aerosol-generating device ("vapor-generating device") such that the cartridge is coupled against (e.g., "abuts") the flange. Restated, operation S1204 may include coupling a cartridge with the aerosol-generating device such that the cartridge abuts the flange and at least partially overlies the device air inlet, where the cartridge includes a second aerosol-forming substrate. The cartridge may have an annular shape. The cartridge may include an end to abut the flange and at least partially cover (e.g., "overlie") the device air inlet. In some example embodiments, vapor-generating systems according to some example embodiments include an annular cartridge configured to be received on a vapor-generating device so that the cartridge overlies a device air inlet. The device air inlet may be positioned on the flange so that an end of the cartridge abuts the device air inlet when the cartridge is received against the flange.

In some example embodiments, the method shown in FIG. 12 may further include engaging a removable cover (e.g., as shown in FIG. 6) with the aerosol-generating device such that the removable cover overlays the cartridge. The removable cover, as described herein, may include a cover air outlet configured to be in fluid communication with a device air outlet based on the engaging, and a cover air inlet configured to be in fluid communication with the cartridge based on the engaging.

The invention claimed is:

1. An aerosol-generating device comprising:

a liquid storage section configured to hold a first aerosol-forming substrate, the first aerosol-forming substrate being a liquid substrate;

a power supply section configured to supply electrical power for the aerosol-generating device;

a flange;

a device air inlet; and a removable cover having a first end that is partially closed and includes a cover air outlet, the liquid storage section configured to removably couple with the power supply section such that outer surfaces of the liquid storage section and the power supply section collectively define at least one element of the flange and the device air inlet, the flange being formed based on a diameter of an end of the power supply section being larger than a diameter of an end of the liquid storage section, wherein the aerosol-generating device is configured to couple with a cartridge such that the cartridge abuts the flange and at least partially overlies the device air inlet, the cartridge including a second aerosol-forming substrate, and the device air inlet is on the flange so that an end of the cartridge abuts the device air inlet based on the cartridge abutting the flange, the removable cover being configured to engage with the aerosol-generating device and overlay the cartridge based on the aerosol-generating device coupling with the cartridge.

2. The aerosol-generating device according to claim 1, wherein the aerosol-generating device further includes:

a first electric heater configured to heat the first aerosol-forming substrate; and a second electric heater on an outer surface of the aerosol-generating device, the cartridge at least partially overlying the second electric heater based on the cartridge being coupled with the aerosol-generating device, the second electric heater configured to heat the second aerosol-forming substrate based on the cartridge being coupled with the aerosol-generating device.

3. The aerosol-generating device according to claim 1, further comprising:

a device air outlet, wherein the cover air outlet is configured to be in fluid communication with the device air outlet based on the removable cover being engaged with the aerosol-generating device, and the removable cover includes a cover air inlet configured to be in fluid communication with the cartridge based on the cartridge being coupled with the aerosol-generating device and the removable cover being engaged with the aerosol-generating device.

4. The aerosol-generating device according to claim 3, wherein a second end of the removable cover is configured to abut the flange based on the removable cover being engaged with the aerosol-generating device.

5. The aerosol-generating device according to claim 1, wherein the cartridge is a sleeve configured to slide onto a portion of the aerosol-generating device.

6. The aerosol-generating device according to claim 1, wherein the cartridge includes a porous wrapper overlying at least a portion of the second aerosol-forming substrate.

7. The aerosol-generating device according to claim 1, wherein the liquid storage section is configured to removably couple to the power supply section such that the flange is collectively defined by the outer surfaces of the liquid storage section and the power supply section.

8. A method of assembling an aerosol-generating system, the method comprising:

removably coupling a liquid storage section to a power supply section to form an aerosol-generating device, the liquid storage section configured to hold a first aerosol-forming substrate, the first aerosol-forming substrate being a liquid substrate, the power supply section configured to supply electrical power to the liquid storage section, the removably coupling including causing outer surfaces of the liquid storage section and the power supply section to collectively define at least one element of a flange and a device air inlet of the aerosol-generating device, the flange being formed based on a diameter of an end of the power supply section being larger than a diameter of an end of the liquid storage section, the aerosol-generating device configured to couple with a cartridge such that the cartridge abuts the flange and at least partially overlies the device air inlet, the cartridge including a second aerosol-forming substrate, the removably coupling couples the liquid storage section and the power supply section such that the device air inlet is on the flange, and the aerosol-generating device configured to couple with the cartridge such that the cartridge abuts the device air inlet based on the cartridge abutting the flange; and engaging a removable cover with the aerosol-generating device such that the removable cover overlays the cartridge when the aerosol-generating device is coupled with the cartridge, the removable cover having a first end that is partially closed and includes a cover air outlet.

9. The method according to claim 8, wherein the cover air outlet is configured to be in fluid communication with a device air outlet based on the engaging; and the removable cover includes a cover air inlet configured to be in fluid communication with the cartridge based on the engaging when the aerosol-generating device is coupled with the cartridge.

10. The method according to claim 9, wherein a second end of the removable cover is configured to abut the flange based on the engaging.

11. The method according to claim 8, wherein the removably coupling couples the liquid storage section and the power supply section such that the flange is collectively defined by the outer surfaces of the liquid storage section and the power supply section.

12. An aerosol-generating device comprising:

a liquid storage section configured to hold a first aerosol-forming substrate, the first aerosol-forming substrate being a liquid substrate;

a power supply section configured to supply electrical power for the aerosol-generating device;

a flange;

a device air inlet; and an electric heater, the liquid storage section configured to removably couple with the power supply section such that outer surfaces of the liquid storage section and the power supply section collectively define at least one element of the flange and the device air inlet, wherein the aerosol-generating device is configured to couple with a cartridge such that the cartridge abuts the flange and at least partially overlies the device air inlet, the cartridge including a second aerosol-forming substrate, and the device air inlet is on the flange so that an end of the cartridge abuts the device air inlet based on the cartridge abutting the flange, the cartridge at least partially overlying the electric heater based on the cartridge being coupled with the aerosol-generating device.

13. The aerosol-generating device according to claim 12, wherein the electric heater is a first electric heater on an outer surface of the aerosol-generating device, the first electric heater configured to heat the second aerosol-forming substrate based on the cartridge being coupled with the aerosol-generating device; and the aerosol-generating device further includes a second electric heater configured to heat the first aerosol-forming substrate.

14. The aerosol-generating device according to claim 12, further comprising:

a device air outlet; and a removable cover configured to engage with the aerosol-generating device and overlay the cartridge based on the aerosol-generating device coupling with the cartridge, the removable cover including a cover air outlet configured to be in fluid communication with the device air outlet based on the removable cover being engaged with the aerosol-generating device, and a cover air inlet configured to be in fluid communication with the cartridge based on the cartridge being coupled with the aerosol-generating device and the removable cover being engaged with the aerosol-generating device.

15. The aerosol-generating device according to claim 14, wherein an end of the removable cover is configured to abut the flange based on the removable cover being engaged with the aerosol-generating device.

16. The aerosol-generating device according to claim 12, wherein the cartridge is a sleeve configured to slide onto a portion of the aerosol-generating device.

17. The aerosol-generating device according to claim 12, wherein the cartridge includes a porous wrapper overlying at least a portion of the second aerosol-forming substrate.

18. The aerosol-generating device according to claim 12, wherein the liquid storage section is configured to removably couple to the power supply section such that the flange is collectively defined by the outer surfaces of the liquid storage section and the power supply section.

19. A method of assembling an aerosol-generating system, the method comprising:

removably coupling a liquid storage section to a power supply section to form an aerosol-generating device, the liquid storage section configured to hold a first aerosol-forming substrate, the first aerosol-forming substrate being a liquid substrate, the power supply section configured to supply electrical power to the liquid storage section, the removably coupling including causing outer surfaces of the liquid storage section and the power supply section to collectively define at least one element of a flange and a device air inlet of the aerosol-generating device, the aerosol-generating device configured to couple with a cartridge such that the cartridge abuts the flange and at least partially overlies the device air inlet, the cartridge including a second aerosol-forming substrate, the removably coupling couples the liquid storage section and the power supply section such that the device air inlet is on the flange, and the aerosol-generating device configured to couple with the cartridge such that the cartridge abuts the device air inlet based on the cartridge abutting the flange, and the cartridge at least partially overlying an electric heater of the aerosol-generating device based on the cartridge being coupled with the aerosol-generating device.

20. The method according to claim 19, wherein the removably coupling couples the liquid storage section and the power supply section such that the flange is collectively defined by the outer surfaces of the liquid storage section and the power supply section.

* * * * *